(12) United States Patent
Gilson et al.

(10) Patent No.: US 12,075,149 B2
(45) Date of Patent: Aug. 27, 2024

(54) DEVICE AND METHOD FOR DETECTING THE ORIENTATION AND POSITION OF MARKINGS IN THREE-DIMENSIONAL SPACE

(71) Applicant: soft2tec GmbH, Ruesselsheim (DE)

(72) Inventors: Laurent Gilson, Hofheim am Taunus (DE); Wolfgang Bruening, Nidderau (DE); Frank Honisch, Ruesselsheim (DE)

(73) Assignee: SOFT2TEC GMBH, Ruesselsheim (DE)

( * ) Notice: Subject to any disclaimer, the term of this patent is extended or adjusted under 35 U.S.C. 154(b) by 0 days.

(21) Appl. No.: 18/005,191

(22) PCT Filed: Jun. 24, 2021

(86) PCT No.: PCT/EP2021/067356
§ 371 (c)(1),
(2) Date: Jan. 12, 2023

(87) PCT Pub. No.: WO2022/012899
PCT Pub. Date: Jan. 20, 2022

(65) Prior Publication Data
US 2023/0269455 A1    Aug. 24, 2023

(30) Foreign Application Priority Data

Jul. 13, 2020    (DE) .................. 10 2020 118 407.7

(51) Int. Cl.
*H04N 23/56*    (2023.01)
*G06T 7/246*    (2017.01)
*G06T 7/73*    (2017.01)

(52) U.S. Cl.
CPC ............. *H04N 23/56* (2023.01); *G06T 7/246* (2017.01); *G06T 7/73* (2017.01); *G06T 2207/10016* (2013.01); *G06T 2207/30204* (2013.01)

(58) Field of Classification Search
CPC . G06T 7/246; G06T 7/73; G06T 2207/10016; G06T 2207/30204; H04N 23/56
See application file for complete search history.

(56) References Cited

U.S. PATENT DOCUMENTS

| 5,227,985 A | 7/1993 | DeMenthon |
| 7,742,895 B2 | 6/2010 | Seko et al. |

(Continued)

FOREIGN PATENT DOCUMENTS

| CN | 111127559 A | 5/2020 |
| DE | 102014012693 B4 | 11/2019 |

(Continued)

OTHER PUBLICATIONS

Ke, Tong et al.; "An Efficient Algebraic Solution to the Perspective-Three-Point Problem"; *2017 IEEE Conference on Computer Vision and Pattern Recognition (CVPR)*; Nov. 9, 2017; pp. 7225-7233; IEEE; Honolulu, HI, USA.

(Continued)

*Primary Examiner* — Brian P Yenke
(74) *Attorney, Agent, or Firm* — LEYDIG, VOIT & MAYER, LTD.

(57) ABSTRACT

A device for orientation and position detection of markings in three-dimensional space includes a marking arrangement, an optical image capture unit and an evaluation unit. The marking arrangement comprises two or more marking units each having three or more illuminating means arranged along a path. At least one marking unit belongs to a first marking unit type having at least three markings, and at least (Continued)

one other marking unit belongs to a second marking unit type having exactly two markings and a communication element arranged therebetween. At least one marking unit of the first type and at least one marking unit of the second type are arranged in a non-coplanar manner. The evaluation unit is adapted to recognize the marking units of the different types and to unambiguously determine the orientation and the position of the marking arrangement using the markings of recognized marking units of the different types.

15 Claims, 4 Drawing Sheets

(56) References Cited

U.S. PATENT DOCUMENTS

| | | | | |
|---|---|---|---|---|
| 9,495,585 | B2* | 11/2016 | Bicer | G06V 40/107 |
| 10,679,366 | B1* | 6/2020 | Liu | G06T 7/74 |
| 11,143,736 | B2* | 10/2021 | Schindler | G01S 3/784 |
| 11,815,345 | B2* | 11/2023 | Gilson | G06T 7/73 |
| 2005/0201613 | A1 | 9/2005 | Mostafavi | |
| 2007/0091178 | A1* | 4/2007 | Cotter | G06T 7/292 |
| | | | | 348/169 |
| 2007/0268366 | A1* | 11/2007 | Raskar | H04N 23/56 |
| | | | | 348/143 |
| 2008/0111985 | A1 | 5/2008 | Bridges | |
| 2010/0014750 | A1* | 1/2010 | Seko | G06T 7/73 |
| | | | | 382/154 |
| 2010/0277583 | A1 | 11/2010 | Rouzes | |
| 2012/0262487 | A1* | 10/2012 | Huebner | G06F 3/1423 |
| | | | | 345/157 |
| 2012/0307021 | A1* | 12/2012 | Tsai | G01B 11/2513 |
| | | | | 348/E13.074 |
| 2013/0076522 | A1 | 3/2013 | Csaszar et al. | |
| 2014/0104169 | A1* | 4/2014 | Masselli | G01B 11/03 |
| | | | | 345/157 |
| 2015/0301179 | A1* | 10/2015 | Christen | G01S 17/48 |
| | | | | 356/3.09 |
| 2016/0321502 | A1* | 11/2016 | Kamath | G06Q 30/00 |
| 2017/0031000 | A1* | 2/2017 | Engelmohr | G01S 5/18 |
| 2017/0365065 | A1* | 12/2017 | Stigwall | H04N 23/56 |
| 2018/0253859 | A1* | 9/2018 | Abrial | G06T 7/70 |
| 2019/0041197 | A1* | 2/2019 | Gernoth | G01B 11/14 |
| 2019/0096068 | A1 | 3/2019 | Fontanel et al. | |
| 2019/0295290 | A1* | 9/2019 | Schena | G06Q 10/0875 |
| 2020/0105019 | A1* | 4/2020 | Boyle | H04N 23/90 |
| 2021/0190483 | A1* | 6/2021 | Ilg | G01B 11/0608 |
| 2022/0175464 | A1* | 6/2022 | Moctezuma de la Barrera | |
| | | | | A61B 90/39 |
| 2024/0029293 | A1* | 1/2024 | Cajic | H04N 23/56 |

FOREIGN PATENT DOCUMENTS

| | | |
|---|---|---|
| DE | 202020103679 U1 | 8/2020 |
| EP | 1498688 B1 | 1/2005 |
| EP | 1813911 A1 | 8/2007 |
| EP | 3059629 A1 | 8/2016 |
| WO | WO 2004/114112 A1 | 12/2004 |
| WO | WO 2006/069748 A1 | 7/2006 |

OTHER PUBLICATIONS

Gao, Xiao-Shan et al.; "Complete solution classification for the perspective-three-point problem"; , *IEEE Transactions on Pattern Analysis and Machine Intelligence*; Aug. 4, 2003; pp. 930-943; vol. 25, No. 8; IEEE; Piscataway, NJ, USA.

Fischler, Martin A. et al.; "Random Sample Consensus: A Paradigm for Model Fitting with Applications to Image Analysis and Automated Cartography"; *Communications of the ACM*; Jun. 1981; pp. 381-395; vol. 24, No. 6; Association for Computing Machinery; New York, NY, USA.

Sarmadi, Hamid et al.; "Simultaneous Multi-View Camera Pose Estimation and Object Tracking with squared planar markers"; *IEEE Access*; Mar. 4, 2019; pp. 22927-22940; vol. 7; XP011712068; IEEE; Piscataway, NJ, USA.

* cited by examiner

| Reference Numeral | Feature |
|---|---|
| 5 | Multi-Marking Arrangement |
| 6 | Imaginary Cylinder Surface |

Fig. 4

| Reference Numeral | Feature |
|---|---|
| 2' | Marking Arrangement |
| 20 | Illumination Means |
| 90 | Captured Image |

Fig. 5

| Reference Numeral | Feature |
|---|---|
| 21 | Marking |
| 22 | Communication Element |
| 30-01 to 30-16 | Straight Paths from Image Evaluation |
| 31-1, 31-2 | Packages Composed of Straight Paths |

DEVICE AND METHOD FOR DETECTING THE ORIENTATION AND POSITION OF MARKINGS IN THREE-DIMENSIONAL SPACE

CROSS REFERENCE TO RELATED APPLICATIONS

This application is a U.S. National Phase application under 35 U.S.C. § 371 of International Application No. PCT/EP2021/067356, filed on Jun. 24, 2021, and claims benefit to German Patent Application No. DE 10 2020 118 407.7, filed on Jul. 13, 2020. The International Application was published in German on Jan. 20, 2022 as WO 2022/012899 under PCT Article 21(2).

FIELD

The present invention relates to a device for orientation and position detection of markings in three-dimensional space is described. Thus, during the orientation and position detection of the markings, their orientation and position in space relative to a defined spatial coordinate system can be determined. The present invention further relates to a method for carrying out the orientation and position detection with the described device as well as a computer program product.

BACKGROUND

Systems and methods are known from the publications EP 1 813 911 A1, US 2005/0201613 A1, EP 1 498 688 B1, WO 2004/114 112 A1, US 2008/0111985 A1, WO 2006/069 748 A1, U.S. Pat. Nos. 5,227,985 A, 7,742,895 B2 and DE 10 2014 012 693 B4, which can determine the orientation and position of an object in space by means of capturing a marking arrangement fixed to the object. For this purpose, optically visible markings are provided on the marking arrangement in a fixed geometric arrangement. Many different arrangements are possible for evaluation. Most of the proposed arrangements provide for at least four markings, of which at least three markings span a plane and at least one marking lies outside this plane. The at least three markings arranged in a plane may lie on at least two non-parallel straight lines spanning the plane. Such an arrangement of the markings enables reliable determination of the orientation and position of the marking arrangement in space from a single captured two-dimensional image of the marking arrangement, which is captured by means of an optical image capture unit (e.g. a camera, in particular a digital camera).

DE 10 2014 012 693 B4 describes a reliably operating but complex system and method. The position and orientation determination is based on a single two-dimensional image of a marking arrangement provided with at least seven markings, which is attached to the object. The system further comprises an image capture unit for acquiring a two-dimensional image of the object or of the marking arrangement arranged on the object, and an evaluation unit for unambiguously determining the orientation and the position of the object on basis of the captured image. The seven markings of the marking arrangement are in a fixed spatial relationship to one another, six of these markings forming a plane, while the seventh marking is arranged outside or at a distance from that plane. The six markings are divided into groups that lie on two different straight lines that intersect at an angle of 90°. The first straight line includes at least four markings, and the second straight line includes at least two other markings. In a top view of the plane, the seventh out-of-plane marking also lies on this first straight line, on a side of the second straight line that faces away from at least two markings of the first straight line. This is important for an unambiguous assignment of the image markings, i.e. the markings depicted in the image, and thus the reconstruction of the orientation and position of the markings in space. During the evaluation, several homographies are calculated for possible assignments. From these homographies, a position determination is reconstructed in each case. Based on this, the average reprojection error (compared to the known actual arrangement of the markings on the marking arrangement) is calculated for all image markings for each position determination. The homography with the lowest error is the correct one and is used for the unique position determination.

This evaluation leads to good results in practice, but is very costly in terms of image evaluation and computational power of the system, especially due to the need to compute more than one homography and to estimate an orientation by applying a Levenberg-Marquardt solver each time. Furthermore, reproduction errors are computed for the coplanar markings and the non-coplanar markings, and the matching minima are used for the evaluation of orientation. This complex computation, and especially the consideration of the high number of markings, leads to problems in live tracking of fast moving objects, because the computational power of systems used in practice is not sufficient, especially if not only one marking arrangement is monitored in a system, but a plurality of marking arrangements, possibly even in one image.

Theoretically, each marking arrangement can be distinguished from other marking arrangements captured in the image by different labels. However, the evaluation of the marking arrangement's surroundings in the image regularly leads to ambiguities when tracking moving objects if these markings (e.g. in the form of stickers) are not exactly visible in the image. In principle, it would also be conceivable to arrange the markings on the marking arrangements in geometrically different ways. However, this leads to a more complex evaluation of many differently arranged markings.

In the industrial environment, it is desirable to be able to sometimes determine the orientation and position of marking arrangements very quickly in order to be able to use real-time applications, especially in production lines. For this purpose, the evaluation of the camera images and the determination of orientation and position must be fast enough to allow an application directly in the production process, e.g. for motion control. Finding the cross shape of the markings arranged in a plane is time-consuming and slows down the position determination. The cross shape of markings in a plane results in comparatively large planar areas of the marking, which makes it difficult to arrange markings in a 360° azimuth angle, especially since an elevated marking can cause other markings to be covered. This leads to different detection accuracy depending on the viewing angle of the camera.

SUMMARY

In an embodiment, the present invention provides a device for orientation and position detection of markings in three-dimensional space. The device includes at least one marking arrangement, at least one optical image capture unit and an evaluation unit. The at least one marking arrangement comprises at least two marking units each having at least three illuminating means arranged along a path, the illuminating means being designed as markings and/or communication elements. The at least one optical image capture unit is configured to capture images of the marking arrangement. The evaluation unit is configured to unambiguously determine an orientation and a position of the marking arrangement from exactly one image of the at least one optical image capture unit. At least one of the marking units belongs to a first marking unit type having at least three markings, and at least one other of the marking units belongs to a second marking unit type having exactly two markings and at least one communication element, the at least one communication element being arranged between the two markings. At least one of the marking units of the first marking unit type and at least one of the marking units of the second marking unit type are arranged in a non-coplanar manner. The evaluation unit is adapted to recognize the marking units of the first marking unit type and the second marking unit type and to unambiguously determine the orientation and the position of the marking arrangement using the markings of recognized marking units of the first marking unit type and the second marking unit type.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a device that has at least one marking arrangement that can be fixed in particular to an object. Thus, by determining the orientation and position of the markings on the marking arrangement, it is then also possible to calculate back to the orientation of the object. The marking arrangement comprises at least two marking units, each having optically active illuminating means arranged along a path (in the sense of a straight, non-curved path). Preferably, the illuminating means of one or each of the marking units are arranged along exactly one straight path, the marking units being arranged in a non-collinear manner. Each of the marking units has at least three illuminating means, which are designed as markings and/or communication elements.

Also the markings and the communication elements are always optically active elements, respectively, which differ at least in their function, as will be described later. As used herein, the term "illuminating means" is also always understood to mean an optically active element, i.e. an illumination device that is switched on or that reflects light. Illumination devices present on the marking unit but not switched on or not reflecting light are not considered (optically active) illuminating means, i.e. the markings or communication elements. This means that a marking unit in operation is arranged to have a certain number of illuminating means present in operation, which can be reliably detected by an optical image capture unit. According to a preferred embodiment, these are light-emitting devices, such as light emitting diodes (LEDs), which are switched on or off and are thus optically active. In principle, however, non-covered light-reflecting surfaces in the sense of illuminating means can also be optically active. Thus, a marking unit adapted to be used in the device provides that, during operation of the marking unit, the illumination devices adapted to this purpose are activated and emit light or reflect light falling on them, for example because the reflecting surface of the illumination device is not covered.

Other illumination devices which are not switched on during operation (i.e. switched off during operation) or which are not reflective, e.g. due to a cover, are not regarded as illuminating means. This does not exclude that all e.g. electrically operated illuminating means are switched off (i.e. temporarily not supplied with power) when the marking unit is not in operation and the device is not used for position detection.

The device also has at least one optical image capture unit that is set up to capture images of the marking arrangement, for example in the form of a digital camera, and an evaluation unit that is adapted to unambiguously determine the orientation and the position of the markings and/or communication elements on the marking arrangement from precisely one image of one of the optical image capture units. For this purpose, the position of the illuminating means (markings or communication elements) on the marking units and the position of the marking units with the markings/communication elements on the marking arrangement are known to the evaluation unit. According to a preferred embodiment, it can be provided that the evaluation unit is set up to determine the orientation and position of the only from the markings.

According to a preferred, basically known embodiment, each marking unit can be formed as illumination devices LEDs that can be switched on and off, preferably in a linear array of several (at least three) LEDs that emit light waves when switched on, preferably in the optically visible or non-visible wavelength range. A particularly preferred embodiment provides infrared LEDs. Preferably, these LEDs can be arranged on a circuit board at a defined distance, for example as an LED path array with LEDs arranged at equidistant distances or as LEDs arranged at specific positions at a predetermined distance (if necessary, individually fixed on a circuit board).

(Only) any arrangement of markings and/or communication elements in a straight path is considered to be a marking unit according to the invention; markings and/or communication elements which do not lie on such a path thus do not constitute a marking unit according to the invention. If only a projection of an optically active illuminating means lies on a path connecting two other optically active illumination means, but the optically active illuminating means is arranged in another plane, this optically active illuminating means does not lie on the path in the sense of the invention connecting the two other light means.

A marking unit can be arranged in its own (individual) housing, so that several individual housings together form the marking arrangement. However, according to an embodiment of the invention, several marking units (e.g. two or three marking units) can also be combined in a defined arrangement relative to one another in a common housing and thus form a marking arrangement according to the invention.

In an embodiment, the invention provides a simplified possibility for orientation and position detection of marking units for a device for orientation and position detection of the kind discussed above, which enables a fast evaluation and high accuracy and detection rate, even with very different camera viewing angles.

In particular, embodiments of the present invention provide that at least one of the marking units belongs to a first marking unit type having at least three or preferably exactly three markings and at least one other of the marking units belongs to a second marking unit type having exactly two markings and at least one communication element. The at least one communication element in the second marking unit type is arranged between the two markings. Preferably—in case of several communication elements—all communication elements are arranged between the two markings. According to the invention, no marking unit should be arranged collinearly with another marking unit of the same marking arrangement, i.e. lie on one and the same straight line.

In order to achieve good orientation detection, at least one of the marking units of the first marking unit type and at least one of the marking units of the second marking unit type are arranged in a non-coplanar manner. The respective linear marking units can—depending on use and application—be positioned comparatively freely in the marking arrangement, whereby according to a particularly preferred embodiment the individual marking units are arranged without overlapping in the marking arrangement in the sense that the marking units do not cross each other. This restriction considerably simplifies the assignment of illuminating means detected in an image to markings used for orientation and position detection. A smallest marking arrangement according to the invention can thus consist of exactly one marking arrangement of the first type and exactly one marking arrangement of the second type (by type is meant the marking unit type) and, according to the invention, preferably have no further illuminating means taken into account in the image evaluation, but which do not include, for example, status LEDs. In such a marking arrangement with exactly two marking units, the marking units (i.e. the paths with the illuminating means) are not arranged in parallel, so that the marking units are not coplanar with each other. Such a smallest marking arrangement can be realized e.g. simply with marking units, which have each their own housing and can be fixed individually at bodies freely. The evaluation unit must then teach in the arrangement of the marking units, for example using a method described later. Alternatively, the arrangement of the marking units can also be measured and fed into the evaluation unit as measured values.

According to the invention, the evaluation unit is designed to recognize the marking units of the first marking unit type and the second marking unit type. This allows the marking arrangement to be detected quickly and with simple image evaluation, despite a possible free arrangement of the individual marking units in the marking arrangement, and their orientation and position to be determined. For this purpose, it is provided according to the invention that the evaluation unit is adapted to an unambiguous determination of the orientation and the position of the marking arrangement using only the markings of recognized marking units of the first marking unit type and the second marking unit type. This makes it possible, solely on the basis of few known patterns in the recorded image that correspond to the first or the second type of marking unit, to recognize very flexibly also different arrangements of the marking units, for example also those that are arranged around an object, and enable orientation and position detection from any viewing angle, in particular azimuth angle.

According to a preferred embodiment, the markings of each of the first and second marking unit types are the same for all marking arrangements of the device. In particular, this means that the markings in the marking units of the first marking unit type and in the marking units of the second marking unit type are each arranged at the same position. With regard to the markings, all marking units of the first marking unit type and all marking units of the second marking unit type are thus identical according to a preferred embodiment. This makes it possible, especially in systems or devices with a large number of marking arrangements, to use the same algorithm for determining the orientation and position of the markings of the marking arrangements. A distinction of the different marking arrangements is then made via the communication elements, which (e.g. due to a unique relative arrangement in the device) allow an unambiguous identification. These communication elements are provided in the marking units of the second type of marking unit in such a way that a coding of the communication elements relative to the markings including the communication elements is different for all marking units of the second type operated in the same device.

The differences of markings and communication elements, which can be realized as hardware possibly by the same illumination devices, result in the evaluation units from the fact that the arrangement of the illumination devices in the evaluation unit is known for each of the marking unit types, i.e. the positions of the illumination devices relative to each other are known and the function "marking" or "communication element" is or can be assigned to each position. According to a particularly preferred embodiment according to the invention, exactly one position of the illumination means in each of the marking unit types is assigned only exactly one of the functions "marking" or "communication element", i.e. there is no double assignment of functions.

According to a preferred embodiment of the invention, each of the marking units of the first and second marking unit types may have between three and seven active illuminating means, i.e., markings and/or communication elements, although more illumination devices may be provided if necessary. However, the marking units of a preferred embodiment are arranged in operation to have no more than three to five active illumination devices activated in operation.

A preferred embodiment limits the number of markings (active illuminating means with the function "markings") to a maximum of five, further preferred to a maximum of four and especially preferred to a maximum of three. The more markings provided, the longer it takes to determine the orientation and position of the markings. Accordingly, a particularly preferred embodiment in accordance with the invention provides that marking units of the first marking unit type have exactly three illumination devices and exactly three markings.

According to a further embodiment, which may preferably be combined with the preceding embodiment, the marking units of the second type of marking unit may have between 6 and 14 illumination devices, preferably between 8 to 12 and particularly preferably 10, of which (preferably exactly) two are used as markings and between 2 to 5 are used as communication elements. Preferably, all marking units of the second type used in a system or device differ in the arrangement of their communication elements. This means that, in each marking unit of the second marking unit type, different illumination devices are activated as communication elements, at least to enable identification.

In a preferred embodiment, it is also possible for the linear arrangement of illuminating means in the first and second marking unit types to be of different lengths. For example, the linear arrangement of illuminating means in the second marking unit type may be shorter than in the first marking unit type. The first and second marking unit types are formed by a path of at least three illuminating means, the path being bounded at each end by end illuminating means to which the function "marking" is assigned (end marking). Between the end markings, in each marking unit type, at least one further illuminating means is arranged on the path connecting the end illuminating means. In a preferred embodiment, the path of the first marking unit type is longer than the path of the second marking unit type. This can be exploited to particular advantage in the orientation detection of the markings.

More communication elements increase the number of data that can be communicated per time unit. This can be exploited if, in addition to identifying the marking arrangement, the communication elements are also used to transmit further data, e.g. in a time-division multiplexing process. However, this also increases the number of different communication patterns, which prolongs the reading of the data information from the communication pattern. In addition, the number of active illuminating means (markings and/or communication elements) increases the power consumption per marking unit and marking arrangement. Often, a larger number of communication elements is not necessary, especially if the communication elements are only used to identify the marking arrangement and/or the marking unit. At least two communication elements and (preferably exactly) two markings in the marking units of the second marking unit type facilitate the distinguishability of marking units of the two marking unit types.

Since according to a particularly preferred embodiment of the invention the energy supply of the marking units (and also of the marking arrangements comprising several marking units) is provided by rechargeable batteries, a limitation to three active markings per marking unit is particularly advantageous. If the marking units are attached to a larger workpiece, for example, they can also be connected to the energy supply of the larger workpiece (e.g., a working tool that operates electrically anyway). In this case, the power supply is not a decisive factor limiting the number of optically active markings and/or communication elements in use. However, in the case of marking arrangements equipped with accumulators, a corresponding power supply interface or a charging interface, for example a wired charging connection or a wireless charging option, for example in the form of an inductive charging interface, is necessary for charging an accumulator. This is more expensive to manufacture and maintain.

With the arrangement of marking units in the marking arrangement in accordance with an embodiment of the invention, it is possible to calculate back to the orientation and position of the marking arrangement in space from the markings recorded in the two-dimensional image with a calibrated camera (in the sense of an optical image capture unit of an embodiment of the invention). For this purpose, there are various solutions known to the person skilled in the art. These include solution methods such as P3P (Perspective-3-Point), in particular known algebraic solution algorithms for the perspective 3-point problem (AP3P method) or iterative solution algorithms for the perspective 3-point problem (iterative P3P), which are known to the person skilled in the art relevant here and are described, for example, in the publications AP3P: Tong Ke and Stergios Roumeliotis. An efficient algebraic solution to the perspective-three-point problem. In Computer Vision and Pattern Recognition (CVPR), 2017 IEEE Conference on. IEEE, 2017, P3P: Xiao-Shan Gao, Xiao-Rong Hou, Jianliang Tang, and Hang-Fei Cheng. Complete solution classification for the perspective-three-point problem. *Pattern Analysis and Machine Intelligence, IEEE Transactions on,* 25(8):930-943, 2003 are described. These well-known algorithms, provided the previously defined conditions are met, find the orientation and position of an object in space from the correspondences of known relations between markings on the object and their two-dimensional image in the image of a calibrated camera.

To make these algorithms more robust against outliers in the point reconstruction in the images, so-called RANSAC (Random Sample Consensus) methods are used, which establish initial correlations between marking units (of the first and second marking unit types) detected in the image. These first correlations can be iteratively improved until the entirety of the relations between the detected marking units detectable in the image are known, and thus the marking unit. With this information, the relations of the markings to each other can be evaluated, and from this the orientation and position of the marking arrangement in space can be determined. The RANSAC procedure is an iterative method for estimating parameters of a mathematical model from a set of observed data containing outliers, when outliers should not affect the values of the estimates. Therefore, it can also be interpreted as an outlier detection method. An explanation of this algorithm can be found, for example, in the paper Martin A. Fischler, Robert C. Bolles: Random Sample Consensus: A Paradigm for Model Fitting with Applications to Image Analysis and Automated Cartography, Communications of the ACM, Jun. 1981, https://doi.org/10.1145/358669.358692.

The application of these methods is known to the skilled person. They can be applied to embodiments of the present invention in the manner described and, if necessary, adapted within the framework of a skilled optimization.

In principle, the invention is independent of the specific type of algorithms (already known in the art) for orientation and position detection.

A particular advantage of the marking arrangement proposed according to embodiments of the invention is that with simple and clearly structured marking arrangements, it is possible to determine the orientation and position of the marking arrangement (relative to usual industrial manufacturing and assembly processes, medical applications e.g. in the context of remotely controlled endoscopically performed operations or comparable applications, e.g. in the inspection of industrial components) de facto (i.e. relative to human motion sequences) in real time, so that tracking of the marking arrangements in real time is also possible. This enables tracking of a movement of the tools, devices or body parts provided with the marking arrangements in real time.

In many applications, the evaluation speed is also sufficient for movements performed by a manipulator (controlled mechanical movement device, colloquially also referred to as a robot), so that the invention can be used universally. Due to the simplicity of the structure and the flexibility, the evaluation of the image points including orientation and position detection is simpler and faster compared to the prior art. Unlike the cross shape known from the prior art, 360° orientation detections can also be easily achieved, for example by arranging the marking units on a kind of cylindrical surface. An important advantage provided for by embodiments of the invention lies in particular in the fact that, regardless of the azimuth angle about the axis of symmetry of the arrangement (i.e., for example, the cylinder axis in the case of an arrangement also of the cylinder surface), the recorded images are comparable and a constant accuracy results over the entire azimuth angle of 360°. This applies in particular to a preferred arrangement of the straight path marking units in which there is no crossing point between the marking units.

According to a preferred embodiment of the invention, the marking arrangement (in the sense of one, more or each of the at least one marking arrangement of the device) comprises at least two marking units of the first marking unit type and at least one marking unit of the second marking unit type, which are fixed relative to each other in a defined arrangement known to the evaluation unit.

In a preferred embodiment, the marking arrangement has exactly two marking units of the first marking unit type and exactly one marking unit of the second marking unit type, in the sense that no further marking units or markings are provided. Preferably, this applies to all marking arrangements of the device, so that the location of the markings in all marking arrangements is the same and each preferable marking arrangement of the device differs from another marking arrangement of the device by (only) the communication elements of the exactly one included marking unit of the second marking unit type. Several of these marking arrangements can be fixedly arranged relative to each other in a common structure, for example in a frame or in a housing, and together form a multi-marking arrangement, in which thus several marking arrangements are fixedly arranged relative to each other. Due to the always identical structure of the marking arrangements, in which all illuminating means (i.e. the markings) used for orientation and position detection are arranged identically, a particularly effective and fast algorithm can be used for position detection.

However, an embodiment of a marking arrangement according to the invention is also conceivable in which at least one marking unit of the second type is always located between two marking units of the first type. If more marking units of the second marking unit type are arranged next to each other in the marking arrangement, the communication rate can be significantly increased, for example if many different marking arrangements have to be operated together in a large system (a large device according to an embodiment of the invention) or if there is a need for a high data transmission rate, for example because a lot of additional information has to be transmitted, be it by a data transmission with only one code or several codes of different codes presented in sequence, in which the data information is transmitted one after the other. A further embodiment can provide that on a body with a non-planar surface, e.g. a cylinder, a cone or another basically arbitrary shape, several marking units of the first and the second type are arranged in such a way that at least one marking unit of the first type and one marking unit of the second type (in a regularly repeating or arbitrary arrangement) are arranged adjacent to each other and are visible in a photograph. In the case of a parallel arrangement of marking units, e.g. on a cylinder surface, preferably two marking units of the first type are arranged adjacent to one marking unit of the second type in such a way that not all marking units are coplanar with each other. A preferred embodiment of this type can be the arrangement on a cylinder body surface, in which the parallel arranged marking units of the first and second type are arranged over the entire surface or at least in sections (with respect to the circumference) along the cylinder axis.

In a particularly preferred embodiment of the marking arrangement, e.g. an embodiment with exactly three marking units (two of the first type and one of the second type), the paths of the illuminating means of the marking units of the first marking unit type lie in a common plane, preferably in such a way that the paths of the illuminating means form two opposite sides of a parallelogram. The end markings of each of the marking units, in which the paths of the illuminating means end, form a corner point. In a particularly preferred embodiment, the straight paths connecting the illuminating means (corner points) may form a rectangle with an end mark in each of the corners of the rectangle. Further, the path of the marking unit of the second marking unit type may be shorter than the first marking unit type, i.e., the distance between the end markings may be shorter for the second marking unit type than for the first marking unit type. In such an embodiment, the marking unit of the second marking unit type may then be arranged within the parallelogram or rectangle spanned by the marking units of the first marking unit type, or more generally within the surface shape formed by connecting the end markings of the marking units of the first marking unit type. This makes it easier to find marks in the one image of the marking arrangement, in which orientation and position detection is then performed based on them.

In a special embodiment, the marking unit of the second type of marking unit can be arranged outside a plane spanned by two marking units of the first type of marking unit, in particular elevated relative to relative to this plane. The elevated arrangement refers to the arrangement of the illuminating means of the marking units in a viewing direction perpendicular to the plane (spanned by the marking units of the first type), wherein the illuminating means are visible. In such an arrangement, the markings of the marking unit of the second marking unit type are thus certainly not coplanar with the markings of the marking units of the first marking unit type. This improves the accuracy in orientation and position detection. According to a preferred embodiment, however, the path of the illuminating means of the second marking unit type can lie in a plane parallel to the plane spanned by the markings of the first marking unit type. This facilitates in particular the orientation detection of the markings in space.

A preferred embodiment of the invention provides that the straight paths of the illuminating means of the marking units of the marking arrangement are arranged in parallel. This is also abbreviated in this text as parallel arrangement of marking units. This statement is to be understood synonymously. This means that straight lines along the (straight) path of the illuminating means of all marking units of a marking arrangement, in particular the marking arrangement with exactly two marking units of the first marking unit type (according to synonym also "marking units of the first type") and exactly one marking unit of the second marking unit type (according to synonym also "marking units of the second type"), do not intersect. The straight lines are not to be understood as infinitely long in the mathematical sense, but as extended paths of the arrangement of the straight lines, which do not intersect over a given length. Paths which are aligned at a small angle of, for example, up to 5° to each other are also considered to be parallel for the purposes of the invention. This includes in particular manufacturing tolerances.

The parallel arrangement of selected or all marking units of a marking arrangement represents a very effective criterion for the selection of marking arrangements belonging to a marking unit and is a very precise boundary condition in the application of algorithms for orientation and position detection. This applies particularly preferably to the two marking units of the first type. In this embodiment, the second marking unit type can also be arranged in any position relative to the first type. Particularly preferably, however, it can be arranged between the marking units of the first type, which makes it particularly easy to assign the markings. However, the invention is not limited to this preferred embodiment, which can be very useful in particular when there are exactly three marking units in a marking arrangement.

In principle, it can be suggested that a marking unit of the first marking unit type is arranged in the marking arrangement adjacent to a marking unit of the second marking unit type (in the entire marking arrangement or only in sections of the marking arrangement), wherein an adjacent arrangement means that one marking unit of the first marking unit type is arranged transversely to the longitudinal direction of a marking unit at least on one of the two sides, and preferably also one marking unit of the first type of marking unit is arranged on each of the two sides, also in the longitudinal direction. In longitudinal direction shall mean in particular that the angle (smallest in amount) between the paths of the marking units of the first and the second type is less than 45° and that the straight paths (adjacent to each other in transverse direction to the straight paths) overlap to at least 50% (in longitudinal direction of the paths).

This particularly preferred embodiment with a parallel arrangement of at least some or all of the marking units of a marking arrangement can in principle also be used if—as already described—several marking arrangements are combined into a common structure and thus form a multi-marking arrangement. The invention is not limited to this, however, and in principle permits a free number of marking units of the first and/or the second marking unit type in a marking arrangement without the one marking arrangement being arranged several times in a multi-marking arrangement. In a spatial arrangement, the marking arrangement particularly preferably forms a convex body as also described below for a further embodiment.

Accordingly, in accordance with one embodiment of the invention, a plurality of marking arrangements comprising at least one marking unit of the first type and one marking unit of the second type can be combined to form a common structure in which the individual marking arrangements are arranged in a defined manner relative to one another and form a multi-marking arrangement, the outer contour of the common structure forming a convex body.

A geometrically simple possibility proposes that the markings (or correspondingly all the illuminating means) arranged in each marking unit on the straight path lie on a sleeve with a round, elliptical or similarly curved cross-section, with all the paths with the illuminating means aligned parallel to one another in the axial direction of the sleeve running perpendicular to the cross-sectional area. This is the case, for example, when all paths with the illuminating means (markings or communication elements) are arranged on a cylindrical sleeve in the axial direction of the cylindrical sleeve, i.e. parallel to each other. This results in a convex body.

For the purposes of the invention, a convex body exists if a straight connection between two markings (or possibly even illuminating means) which are not immediately adjacent or not collinearly arranged in the same marking unit runs within or along the outer contour of the body. If the shape of the body is not as clear as in the case of, for example, a cylindrical body, the outer contour can be formed such that in each case the three markings (or illuminating means) having the shortest distance to each other are connected by a triangular surface. In this way, an outer contour is formed in each case, on the basis of which the presence of a convex outer contour can be checked. Openings remaining in edge areas, e.g. at the end faces of the body, are closed by triangular areas starting from points of intersection of the individual contour surfaces. Such multi-marking arrangements can be arranged around any body, with the convex body shape guaranteeing optimum visibility of the markings used for orientation and position detection.

According to a preferred embodiment, the evaluation unit is set up to perform a method described below or parts thereof. In particular, the method described below or certain embodiments thereof may be particularly suitable for specific ones of the embodiments described above.

An embodiment of the invention therefore also relates to a method for detecting the orientation and position of markings in three-dimensional space, in particular using one of the embodiments of the device described above, in which the evaluation unit is set up to carry out the method or parts of the method. According to an embodiment of the invention, the method comprises in particular the following steps, which can be carried out in the sequence described below. If technically possible, however, the sequence can also be changed without departing from the subject matter of the invention.

Capturing an image of at least one marking arrangement comprising at least one marking unit of a first marking unit type and at least one marking unit of a second marking unit type, each comprising at least three optically active illuminating means arranged along a path. According to a preferred embodiment, the marking units of the first type may have a fixed number of illuminating means, in particular three, which are arranged in the identical position in each marking unit and have the function of markings. The marking units of the second type have, with the illuminating means arranged in a path, illuminating means serving as markings (also referred to as end markings), in particular at the two opposite ends. All other illuminating means of the marking units of the second type, which are arranged between the two markings, can serve as communication elements according to a preferred embodiment of the device according to the invention, which can preferably be arranged differently for each marking unit of the second type according to the invention, in particular by optically activating or switching on different illumination devices, respectively. These can also be selected such that the marking units of the first and second type can be distinguished by the (optically active) illuminating means, on basis of their position and/or their number, particularly preferably at least by their number. Thus, the marking units of the second type can preferably have between exactly two and five, i.e. exactly two, three, four or five, communication elements and exactly two markings (at the beginning and end of the path, respectively).

Detection of the illuminating means in the captured image. Using conventional image detection software, the individual illuminating means are recognized as illuminated points in the image and unique 2-dimensional image coordinates ($x_B$, $y_B$), also known as pixel coordinates, are assigned to the points in the image. These image coordinates can then be used to subsequently perform further evaluations. Examples of this will be described later.

Assigning detected illuminating means to at least one marking unit of a first marking unit type with illuminating means designed exclusively as markings, and assigning detected illuminating means to at least one marking unit of a second marking unit type with illuminating means designed as markings and communication elements. This is done by evaluating the image coordinates of the detected illuminating means and an assessment of whether a selection of certain illuminating means in the image (i.e. their image coordinates) matches or could match the arrangement of the markings in the first or second marking unit type (known in the evaluation unit performing the steps). Suitable selection criteria are specified for this purpose.

Assigning the function marking or the function communication element to the illuminating means detected in the image. This can be done in particular based on the assignment of the illuminating means to one of the two marking unit types.

Determining the orientation and the position of the marking arrangement based on the markings, i.e. on the basis of the illuminating means with the assigned function "marking", knowing the arrangement of the markings on the marking arrangement, respectively the arrangement of the markings on the marking units and the arrangement of the marking units in the marking arrangement, which is synonymous in the sense of the invention. According to embodiments of the invention, this can be done using the algorithms and RANSAC methods already described.

Preferably according to an embodiment of the invention, the assignment of the marking units to the first or the second marking units can include the step of determining all straight paths with a total of exactly three illuminating means (i.e. a total of three markings and/or communication elements) in the captured image. This means that all exactly three illuminating means, that can be reliably detected in the image (markings and/or communication elements) and that are arranged in a straight path, are collected in an entirety of straight paths with three (optically active) illuminating means, regardless of whether the illuminating means are markings or communication elements. These paths are recorded and can be kept, for example, as a 3-tuple with the image coordinates of each of the exactly three markings/communication elements in a list, for example. A 3-tuple thus describes a straight path with three markings/communication elements that can be recognized in the captured image. All 3-tuples determined in this way then form the entirety of straight paths. A 3-tuple has for example the form [$x_B$ (1), $y_B$ (1); $x_B$ (2), $y_B$ (2); $x_B$ (3), $y_B$ (3)], where the numbers in brackets are the numbering of the detected illuminating means (markings/communication elements).

The paths preferably end in each case in illuminating means between which there is another illumination means. The illuminating means in which the straight paths end are also referred to as end points.

If there are more than three markings or communication elements arranged on a straight path in the captured image, each possible sub-combination with exactly three markings or communication elements (i.e. three illuminating means) is considered to be one of the determined straight paths with exactly three markings/communication elements and is recorded in the entirety of straight paths, e.g. included in the list of 3-tuples. In the following, straight paths are sometimes referred to simply as paths for the sake of simplicity. These terms are used thus synonymously.

In a device preferred according to an embodiment of the invention, in which the length of the marking units (respectively the paths on which the illuminating means are arranged) of the first and the second marking unit type are approximately the same length, i.e. differ in particular by no more than up to 10%, preferably up to 5%, it can be assumed that, despite a possible perspective distortion during image capture, the length of the paths (respectively the distance between the end points of the paths formed by end markings) are approximately of the same length. This is especially true with a typical length of the marking units in the range between three and fifteen centimeters, preferably between three and six centimeters, and a distance of the camera (image capture unit) to the captured marking arrangement of more than at least one meter, preferably between two to five or two to ten meters. This is usual for typical applications. In this case, as a selection criterion for paths possibly belonging to a marking arrangement, those paths can be determined from the entirety of the determined straight paths for which the distance between the end points of the straight paths is comparable. Such paths can be assembled into a packet, whereby several packets can be determined in one image if necessary, in particular if several different marking arrangements are detected in one image.

In a device according to an embodiment of the invention in which the marking units (respectively the paths on which the illuminating means are arranged) are arranged in parallel, this parallel arrangement can be used as an alternative or further selection criterion for paths which possibly belong to one marking arrangement. Due to perspective distortion during image capture, it cannot of course be assumed that paths extended to infinitely long straight lines in the mathematical sense do not intersect in the two-dimensional coordinate system of the image.

In a very simple evaluation, at least paths directly intersecting in the image coordinate system can be excluded as non-parallel. In a preferred variant in the use of this selection criterion it could be checked whether an extension of the straight path by a certain extension factor, for example an extension factor 1.5 and 5 at one or both ends, results in the extended paths intersecting. Also in this case, such paths intersecting as extended paths could be excluded as non-parallel, and an extension factor may also be parameterizable, in particular depending on the application case and/or the acquisition geometry. The selection of suitable extension factors, possibly also outside the preferred range mentioned above, is within the grasp of the person skilled in the art. Such paths can also be combined to form a package. An analogously reversed criterion can be applied if—for example in a marking arrangement with only two marking units—parallel straight paths are to be just excluded.

If such criteria are applied to the image of the illuminating means, and in particular if these criteria and/or further criteria are combined, packages of paths can already be selected on the basis of an evaluation of the image of the illuminating means alone, which in practice lead to an effective preselection of illuminating means belonging to a marking arrangement. A preselection of illuminating means, which are basically possible as illuminating means of a marking unit due to their arrangement, increases the evaluation speed considerably, because time-consuming calculations for orientation and position detection can be limited to promising groups of possible markings. This allows de facto real-time applications in detected motion sequences, e.g. to determine when a certain marking reaches a certain position (tracking).

Further selection criteria can be determined if the arrangement and the number of marking units in a marking arrangement are known. For example, in one embodiment of the device, if a total of three marking units are combined in a marking arrangement, with a marking unit of the second marking unit type each flanked by a marking unit type of the first marking unit type, such arrangements of paths can be searched for in the image. Specifically, paths may be selected from the selected packets of paths in which at least one path having a different relative arrangement of illuminating means is disposed between two straight paths having similar relative arrangements of illuminating means. Thus, the path(s) located in the middle could be a path of second marking unit type, and the straight paths located on the outside could be paths of first marking unit type. As a further criterion for paths of first marking unit type, a relative ratio of the spacing of the illuminating means on a path may also be a criterion if the marking units of first and second type can be so significantly distinguished. Paths that meet such a sorting criterion can then be assigned to a possible marking unit type. This applies in particular if all marking units have a basically identical arrangement of marking units according to a particularly preferred embodiment of the invention.

According to a more general approach, it can be provided according to an embodiment of the invention that before an assignment of determined straight paths to the first marking unit type, an assignment of paths to the second marking unit type takes place. This contains communication elements, on the basis of whose arrangement an unambiguous identification of the marking arrangement can or does take place. According to an embodiment of the invention, the marking arrangements set up in a system with the relative arrangement of their marking units relative to one another are known in the evaluation unit.

With the knowledge of the arrangement of the marking units of the first and second type in the identified marking arrangement, paths can be determined in the captured image which may belong to the identified marking arrangement. Thus, in the vicinity of a marking unit of the second type, a targeted search can be made for marking units belonging to this marking arrangement. In this way, too, possible marking units can be identified quickly and reliably in practice just by means of an image evaluation of the recorded image. Accordingly, according to a particularly preferred embodiment, it can be provided that those paths belonging to a marking unit type of the second marking unit type are selected from the determined straight paths, and an identification of the marking arrangement is derived from the communication elements of the second marking units. Thus, the structure of the marking unit and the arrangement of markings on the marking unit are known.

In a particularly preferred embodiment, it is therefore possible to define search areas in the recorded image based on markings of the second type of marking unit, in which markings are searched for. If illuminating means are found in the search areas in the recorded image, they are assigned to the marking unit as markings and can be used to determine orientation and position.

In a simple embodiment, straight paths of a second type of marking unit can be recognized by the fact that they have a significantly different ratio in the arrangement of the illuminating means to each other than paths of the first type of marking unit.

A simpler and safer possibility for detection arises if the marking units of second type of marking units have (exactly) two markings as end markings of the path of illuminating means, at least two communication elements arranged on the path between the markings and the (exactly) two markings, i.e. the end markings, are the same for all marking units of second type in the device (i.e. an overall system or installation). The communication elements provided between the (end) markings, on the other hand, are distinguishably different for each marking unit in the system.

According to an embodiment of the invention, these marking units of the second type can be easily determined by selecting from the determined straight paths those paths which have the same end points (respectively detected illuminating means) in the captured image. In the case of at least two communication elements, at least two straight paths with the same end points and different illuminating means are accordingly found on the path between the end points. Accordingly, to the end points (illuminating means) is assigned the function "marking" and to the illuminating means located between the end points is assigned the function "communication element". Thus, from the one image, the marking unit of the second type can be reconstructed with the coding of the communication elements and the coding can be read out, for example by comparison with known patterns of the coding. This is possible from the captured image alone, without the need for orientation and/or position detection.

The communication elements could display a unique identifier (identification) of this marking unit, via which, for example, the marking arrangement can be uniquely identified. In addition, according to an embodiment of the invention, the communication elements can also be used to communicate further information, possibly in several successively recorded images, by means of coded data that are assembled and decoded in the evaluation unit. This information can contain, for example, information about tools to which a marking unit is attached, such as a battery status of the tool, functions executed by the tool, or detected data values. The skilled person is familiar with concrete possibilities for this, for example, from DE 10 2019 114 531 A1.

According to a preferred embodiment of the invention, after a straight path belonging to the second marking unit type has been determined, and knowing the arrangement of the marking units of the now identified marking arrangement, a search area can be defined in which a search is made for a straight path belonging to the first marking unit type. If such a marking unit is found, it can be assumed that the marking arrangement is reliably identified. The illuminating means detected in the image are now assigned to the remaining markings of the marking unit, as far as possible, by assigning the "marking" function to the illuminating means detected in the image.

These markings are then used to determine the orientation and the position of the marking arrangement based on the markings in knowledge of the arrangement of the markings on the marking arrangement, for example by means of the algorithms described.

In the case that the arrangement of the marking units in the marking arrangement is not known a priori, e.g. because individual marking units of the first and the second type of marking units are not fixed collinearly to an object to form a marking arrangement in a basically arbitrary manner, with preferably at least one of the markings not lying in a common plane with remaining markings of the marking units of the marking arrangement, an embodiment of the invention provides a further method, in particular in connection with the method for orientation and position detection of markings in three-dimensional space according to an embodiment of the invention, which further method is executed at least once before the execution of the previously described method for orientation and position detection and which learns the position of the markings and communication elements.

This method according to an embodiment of the invention for teaching in the set-up of markings and communication elements in a marking arrangement in which at least one marking unit of a first marking unit type and at least one marking unit of a second marking unit type are positioned, each having at least three optically active illuminating means arranged along a path. The arrangement of illuminating means used as markings or communication elements in the marking units of the first marking unit type and the second marking unit type are known a priori. Preferably, the marking units of the first marking unit type and the second marking unit type described above are used.

In the method according to an embodiment of the invention, the following steps are carried out:

Moving the marking arrangement with the fixed marking units relative to an image capture unit and capturing a sequence of images during said moving, wherein all marking units are visible for a predetermined or predeterminable minimum duration and for a predetermined or predeterminable minimum rotation by the image pickup means, i.e. in each of the images of the picked up sequence of images. The relative movement of the marking arrangement may be a translation and/or rotation performed by the marking arrangement or the image capture device.

Detection of potential marking arrangements in an image of the image sequence. According to an embodiment of the invention, this can be done with the image evaluation explained in connection with the previously described method, in particular the detection of straight paths with a total of exactly three illuminating means in the recorded image, which are then assigned to the potential marking units of the first or the second marking unit type.

Tracking of the potential marking units over several images of the sequence of images. According to an embodiment of the invention, tracking of the potential marking units can be realized such that the movement is small compared to the frame rate (i.e., a correspondingly slow rotation and/or translation takes place according to an embodiment of the invention). Then, plausibility considerations can be made in the context of image detection based on the fact that the potential marking units as well as the distance of the potential marking units do not change relative to each other.

By the basically known and already explained RANSAC method, it is possible to create initial relations between the sub-arrays and to iteratively improve the relations over the entire image sequence through numerical optimization until the entirety of relations over the entire image sequence with the rotational motion is known;

Deriving the arrangement of the marking units from the entirety of relations based on geometric assignments. This procedure is known to the person skilled in the art in the context of methods for image evaluation.

The arrangement of the marking units in the marking arrangement is thus determined, and the orientation and position detection method described above can then be carried out. According to an embodiment of the invention, the method for teaching in the arrangement of markings and communication elements in a marking arrangement can be carried out at least once before the repeated execution of the orientation and position detection of the markings, if this is not yet known.

In order to avoid interference and improve accuracy, during the implementation of the proposed method for teaching in the arrangement of markings and communication elements in the marking arrangement, it is preferably ensured that no illuminating means are arranged in the image area of the image capture unit during the acquisition of the image sequence, which are not arranged in one marking unit.

Further advantages, features and application possibilities of embodiments of the invention result from the following description of preferred embodiment examples and the drawings. Thereby, all described and/or depicted features belong together or in any technically reasonable combination to the subject matter of different embodiments of the invention, also independently of their summary in described or depicted embodiment examples.

Figure 1:
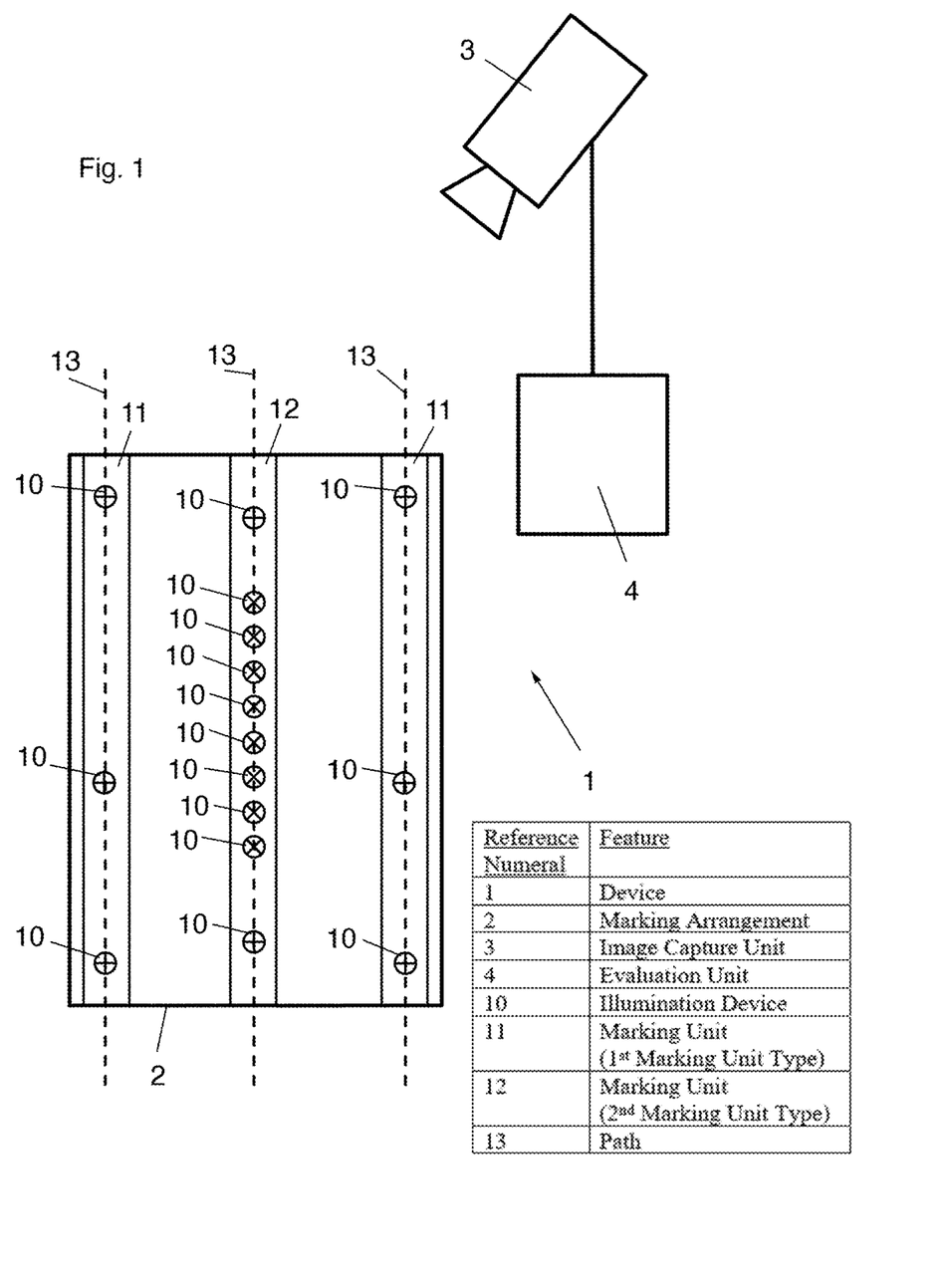
FIG. 1 is schematically a preferred embodiment of the device according to the invention.

FIG. 1 schematically shows a device 1 for detecting the orientation and position of markings in three-dimensional space with a marking arrangement 2. In the example shown, the marking arrangement 2 comprises a total of three marking units 11, 12 with illumination devices 10 arranged along a path 13. The illumination devices 10 are optically active when switched on and emit light or, particularly preferably, infrared light. The illumination devices 10 may in particular be configured as LEDs that can be switched on and off, which may for example be arranged on a circuit board. In the optically active state, the illumination devices 10 are also referred to as illuminating means 20, which are shown in dark in FIGS. 4 to 7. In FIG. 1, all of the illumination devices 10 are shown in an off state. In operation of the device 1, each of the marking units 11, 12 has at least three illuminating means 20, i.e. switched-on illumination devices 10, wherein the illuminating means 20 are designed as markings 21 and/or communication elements 22.

The device 1 comprises an optical image capture unit 3, in particular designed as a camera (digital camera), which is calibrated in space. The image capture unit/camera 3 is set up to capture images 90 of the marking arrangement 2. The camera 3 is connected to an evaluation unit 4, adapted in the manner already described for unambiguous determination of the orientation and the position of the marking arrangement 2 from exactly one image 90 of the one optical image capture unit 3.

The marking arrangement 2 has two marking units 11 of a first marking unit type with three illuminating means 20 in operation. In the example shown here, therefore, all three illumination devices 10 of the two marking units 11 are switched on and adopt the function of a marking 21. This function is indicated in FIG. 1 by a cross shown in the illumination device 10. Accordingly, all marking units 11 in operation are formed identically with three illuminating means 20 at exactly the same position. These can usually already be identified by the relative spacing of the illuminating means 20 in the captured image.

Between the two marking units 11 of the first type of marking unit, a marking unit 12 of a second type of marking unit is arranged in the marking arrangement 2 with, in operation, exactly two markings 21 (cross in the illumination device 10) and at least one communication element 22. This "communication element" function is indicated in FIG. 1 by an X shown in the illumination device 10. On the hardware side, however, the illuminating devices 10 can preferably have the same design, irrespective of their "marking" or "communication element" function.

In the marking unit 12 of the second marking unit type, the two illuminating means 20 serving as markings 21 are arranged at the two ends of the marking unit and are also referred to as end markings. This definition applies generally in this text. Between these (exactly two) markings 21, the at least one illuminating means 20, but preferably the at least two to five illuminating means 20, of the marking unit 12 are arranged, which adopt the function of communication elements 22.

According to a preferred embodiment of the device 1 according to the invention, the communication elements 22 of the at least one marking unit 12 of the second type of the marking arrangement 2 serve to uniquely identify the marking arrangement 2. This is achieved by that, in a device 1, all the marking units 2 used are each configured to show a unique combination of communication elements 22.

All illumination devices 10, and correspondingly all markings 21 and, if applicable, communication elements 22 of the marking units 11, 12 lie on a path 13, with the (all) communication elements 22 being arranged between the two markings 21 of the marking unit 12. This facilitates the evaluation. Furthermore, the distance of the end markings (in the sense defined before) is different for the marking units 11 of the first marking unit type and the marking units 12 of the second marking unit type, preferably the distance of the end markings is smaller for marking units 12 of the second type than for marking units 11 of the first type. Furthermore, all marking units 11, 12 of the marking arrangement 2 are arranged in parallel, i.e. the paths 13 of their illuminating means 10 run parallel. Particularly preferred is the variant shown in which the marking units 11 of the first marking unit type span a rectangle and the marking unit 12 of the second type of marking unit is arranged symmetrically along the central axis of this rectangle in the rectangle. The resulting arrangement of markings 21 can be easily recognized by suitable selection criteria in the recorded image 90 and selected for evaluation.

Figure 2:
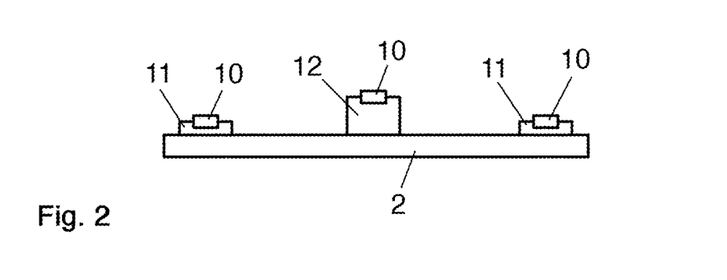
FIG. 2 is a side view of the marking arrangement shown in FIG. 1.

As can be seen in the side view of the marking unit 2 according to FIG. 2, the marking unit 12 of the second type is arranged in an elevated position between the marking units 11 of the first type. This ensures that the marking unit 12 is not arranged coplanar with the two marking units 11, which span a plane.

Knowing the arrangement of the marking units 11, 12 in the marking arrangement 2, the evaluation unit 4 is adapted to recognizing the marking units 11 of the first marking unit type and marking units 12 of the second marking unit type or, equivalently, their markings 21 and to unambiguously determine the orientation and the position of the marking arrangement 2 using (preferably exclusively) the markings 21 of recognized marking units 11, 12 of the first marking unit type and of the second marking unit type.

Figure 3:
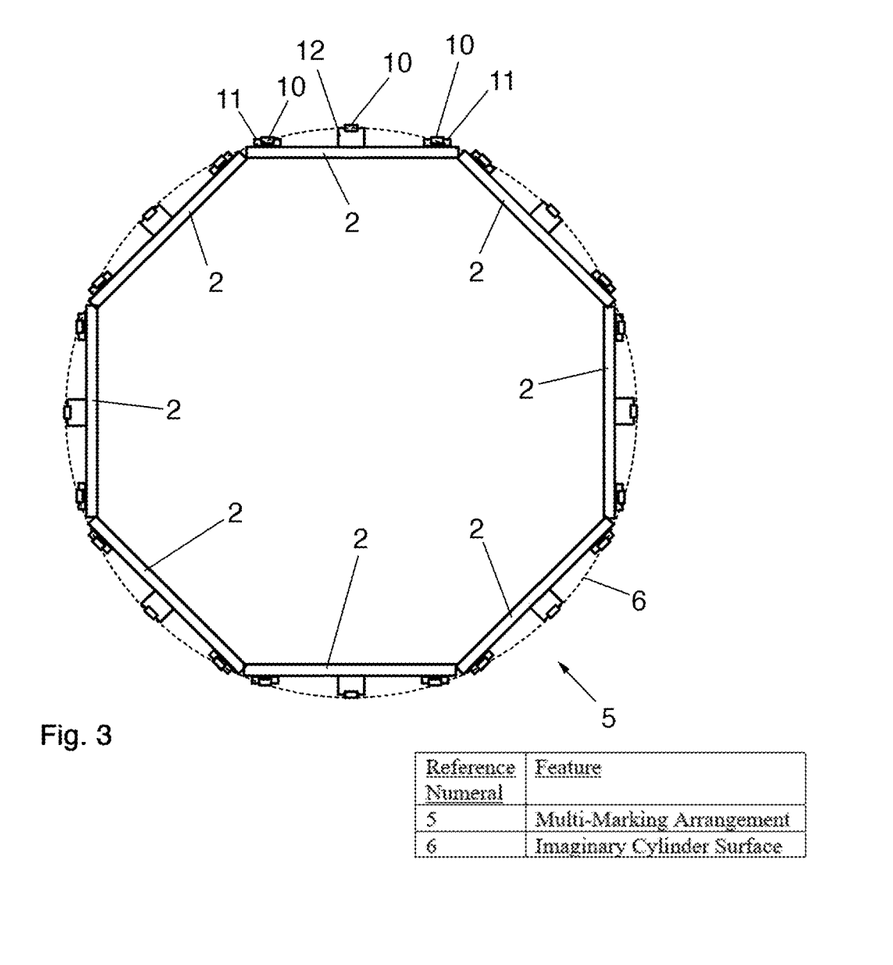
FIG. 3 is a side view of an alternative embodiment of a marking arrangement according to the invention.

FIG. 3 shows a multi-marking arrangement 5 in which several marking arrangements 2 are arranged in the shape of a hollow cylinder such that the illuminating devices 10 lie at least approximately on an imaginary cylinder surface 6. Thus, the multi-marking arrangement 5 represents an embodiment example for a convex body, the orientation and position of which can be reliably detected even with only one camera 3 in space at almost any position of the multi-marking arrangement 5. A preferred use of such a multi marking arrangement 5 therefore is an use in which the multi marking arrangement 5 is fixed around a working tool.

Figure 4:
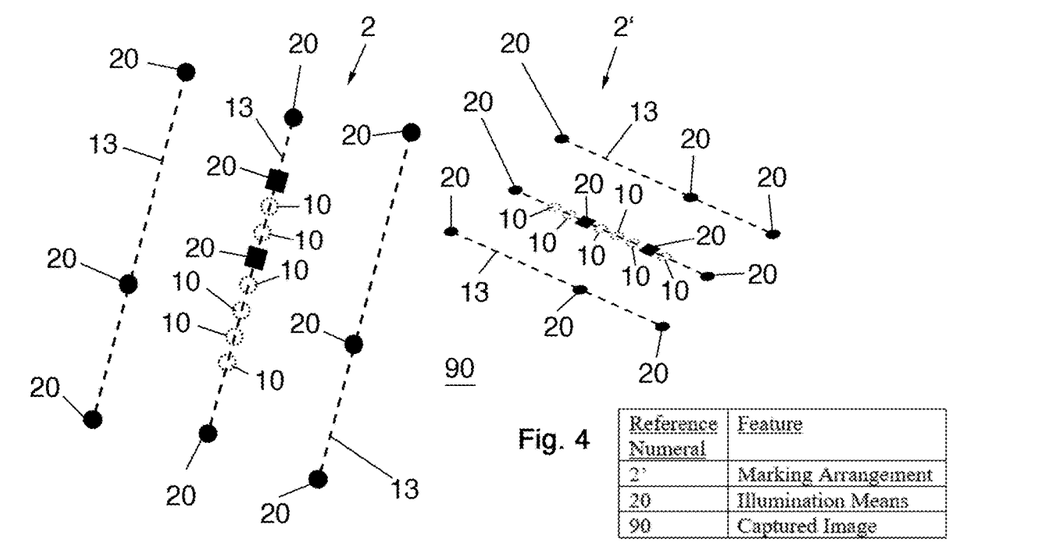
FIG. 4 is schematically an image taken during the implementation of a preferred embodiment of the method according to the invention with two marking arrangements visible in the image.
Figure 5:
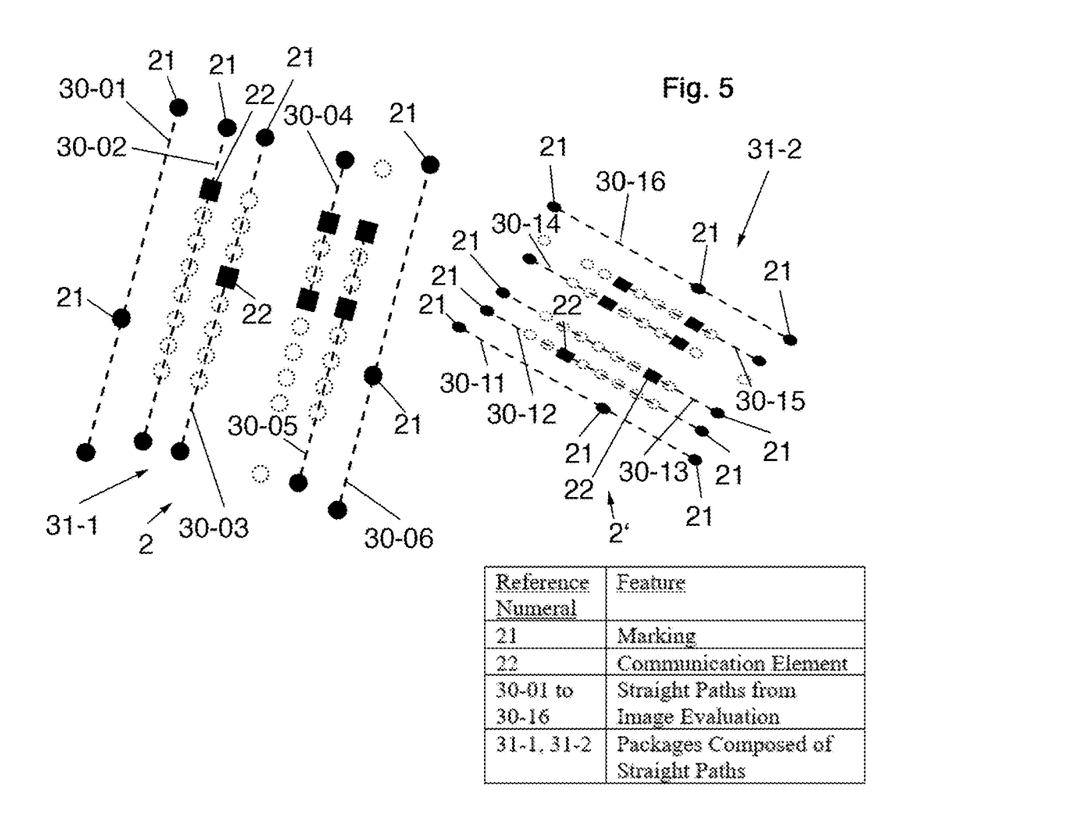
FIG. 5 is schematically straight paths with three illuminating means determined during the implementation of a preferred embodiment of the method for the image according to FIG. 4.

With reference to FIGS. 4 and 5, the basic procedure for image evaluation in the context of the application of the proposed method for determining the orientation and position is described below.

FIG. 4 shows an image 90 from a camera or optical image capture unit 3, which is fed to the evaluation unit 4 for evaluation and execution of the method according to the invention.

Image 90 shows two marking arrangements 2, 2' that are located at different distances and orientations in space. In particular, the marking arrangements 2, 2' can be fixed to objects in space, such as tools or body parts, in order to be able to track a movement sequence.

In the image, only the illuminating means 20 are visible as light points. Neither the paths 13 on which the illuminating means 20 are arranged, nor the illumination devices 10 (which are not switched on and thus optically inactive), which are shown in FIG. 4 as dashed circles at the positions where they are arranged on the marking units 11, 12. Also, the illuminating means all look the same in the image 90. The different shapes (circle for marking 21 and square for communication element 22) cannot be gathered from the image per se. This information is first determined in the course of the image evaluation explained below.

In a process step, all illuminating means 20 in the image 90 are detected and two-dimensional image coordinates ($x_B$, $y_B$) are assigned to them. This identifies each illuminating means 20 in the captured image 90.

Subsequently, all straight paths 30-01, 30-02, 30-03, 30-04, 30-05, 30-06 and 30-11, 30-12, 30-13, 30-14, 30-15, 30-16 with a total of three illuminating means 20 are determined in image 90, as shown schematically in FIG. 5. All parallel straight paths 30 are assembled into packets 31-1 and 31-2, which can potentially belong to a marking arrangement 2, 2'. Furthermore, those straight paths 30-01, 30-02, 30-03, 30-06 and 30-11, 30-12, 30-13, 30-16 are selected from the packets 31-1 and 31-2 which are approximately of the same length, i.e. have a comparable distance between the end points (end markings). In the example shown, straight paths 30-04 and 30-05 and 30-14 and 30-15 are significantly shorter. These can thus not be assigned to any of the marking arrangements 2, 2' and are deleted from the packets 31-1 and 31-2, respectively.

In the remaining straight paths 30 of the packages 31-1 and 31-2, those straight paths 30-02, 30-03 as well as 30-12, 30-13 are selected which have the same end points (respectively end markings in the sense of illuminating means 20 arranged at the end of the straight paths) with different positioned illuminating means 20 between the end points. It is noted that these paths 30-02, 30-03 as well as 30-12, 30-13 are superimposed in the image 90 (corresponding to FIG. 4) and their end points have respectively the same image coordinates (respectively for each packet 31-1 and 31-2). These paths are shown side by side in FIG. 5 to illustrate this evaluation step.

Paths 30-02 and 30-03 can thus be assigned to a marking unit 12 of the second type of one marking arrangement 2, and paths 30-12 and 30-13 can thus be assigned to a marking unit 12 of the second type of another marking arrangement 2'. Thus, an assignment of markings 21 and communication elements 22 is then possible. From the pattern of communication elements 22, moreover, the marking unit 2 or 2' can be clearly identified.

The illuminating means 20 of the remaining paths 30-01, 30-06 as well as 30-11, 30-16 are assigned according to marking units 11 of the first type. The illuminating means 20 are then corresponding markings 21.

From the markings 21 now assigned to each of the detected marking arrangements 2, 2', the evaluation unit 4 calculates the orientation and position of the marking arrangements 2. 2' in the manner already explained and basically known to the skilled person.

Figure 6:
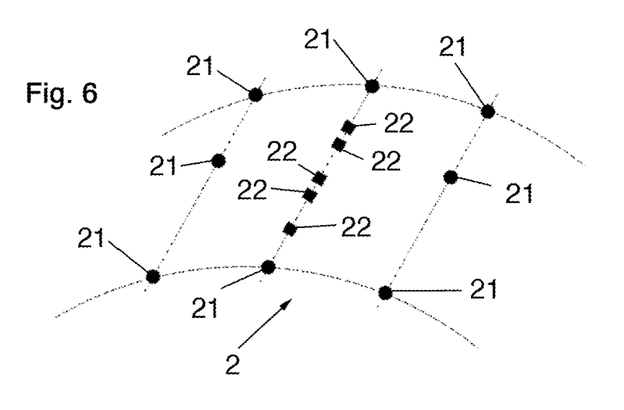
FIG. 6 is a concept representation of the spatial arrangement of markings and communication elements in a marking arrangement of FIG. 1.

FIG. 6 shows a three-dimensional arrangement of markings 21 and communication elements 22 for a marking arrangement 2 in which five communication elements 22 are provided.

Figure 7:
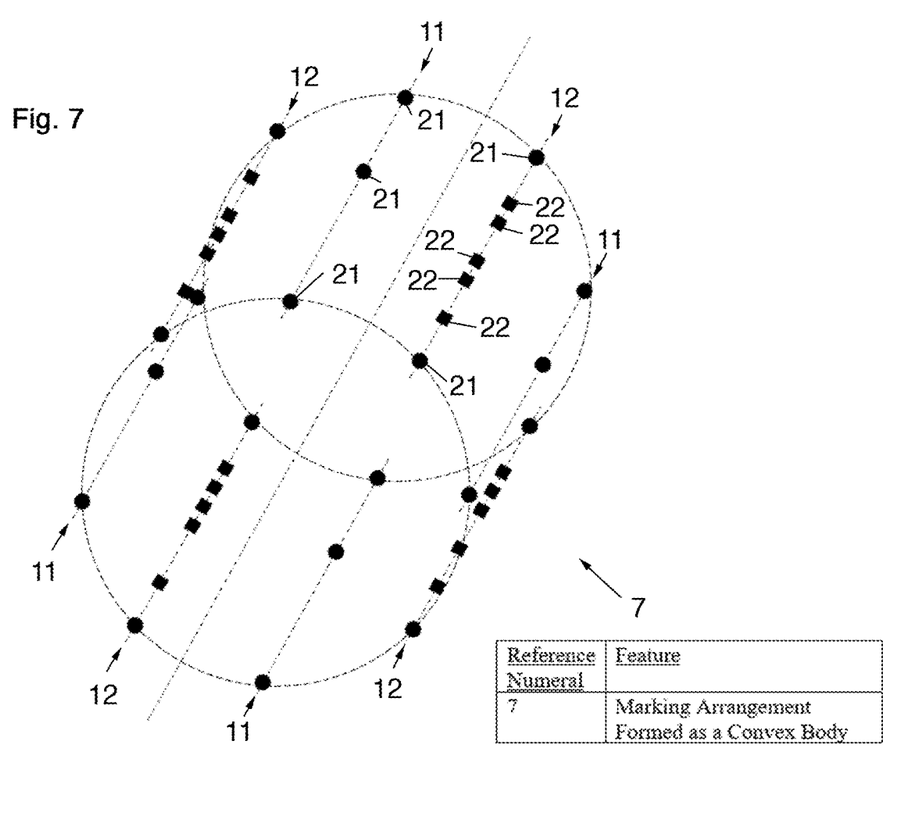
FIG. 7 is a concept representation of the spatial arrangement of markings and communication elements in a marking arrangement similar to that shown in FIG. 3.

FIG. 7 shows a three-dimensional arrangement of markings 21 and communication elements 22 for a marking arrangement 7 designed as a convex body, which is basically similar to the multi-marking arrangement 5 shown in FIG. 3.

The markings 21 and communication elements 22 are positioned on a cylinder surface 6 on which a marking unit 11 of the first type and a marking unit 12 of the second type are always alternately arranged next to each other. In addition to the markings 21 at its opposite ends, each marking unit 12 has five communication elements 22, each in a different coding, which allows orientation recognition of an object connected to the marking arrangement 7 even if only one second type marking unit 12 is picked up by an image capture unit 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 device
2, 2' marking arrangement
3 image capture unit designed as a digital camera
4 evaluation unit
5 multi-marking arrangement
6 imaginary cylinder surface
7 marking arrangement formed as a convex body
10 illumination device
11 marking unit of the first marking unit type
12 marking unit of the second marking unit type
13 path
20 illuminating means
21 marking
22 communication element
30 straight paths from image evaluation
31 packages composed of straight paths
90 captured image

The invention claimed is:

1. A device for orientation and position detection of markings in three-dimensional space, the device comprising:
at least one marking arrangement, the at least one marking arrangement comprising at least two marking units each having at least three illuminating means arranged along a path, the illuminating means being designed as markings and/or communication elements;
at least one optical image capture unit configured to capture images of the marking arrangement; and
an evaluation unit configured to unambiguously determine an orientation and a position of the marking arrangement from exactly one image of the at least one optical image capture unit,
wherein:
at least one of the marking units belongs to a first marking unit type having at least three markings,
at least one other of the marking units belongs to a second marking unit type having exactly two markings and at least one communication element, the at least one communication element being arranged between the two markings,
at least one of the marking units of the first marking unit type and at least one of the marking units of the second marking unit type are arranged in a non-coplanar manner, and
the evaluation unit is adapted to recognize the marking units of the first marking unit type and the second marking unit type and to unambiguously determine the orientation and the position of the marking arrangement using the markings of recognized marking units of the first marking unit type and the second marking unit type.

2. The device according to claim 1, wherein the at least one marking arrangement comprises two marking units of the first marking unit type and one marking unit of the second marking unit type.

3. The device according to claim 2, wherein the marking unit of the second marking unit type is arranged outside a plane spanned by the two marking units of the first marking unit type.

4. The device according to claim 1 wherein the straight paths of the illuminating means of the marking units of the marking arrangement are arranged parallel to one another.

5. The device according to claim 1 wherein one marking unit of the first marking unit type is always arranged adjacent to one marking unit of the second marking unit type in the marking arrangement.

6. The device according to claim 1, wherein several marking arrangements are combined into a common structure in which individual marking arrangements are arranged in a defined manner relative to one another and form a multi-marking arrangement, an outer contour of the common structure forming a convex body.

7. The device according to claim 1, wherein the evaluation unit is configured to:
   detecting the illuminating means in the captured image of the at least one marking arrangement comprising the at least one marking unit of the first marking unit type and the at least one marking unit of the second marking unit type;
   assigning detected ones of the illuminating means designed exclusively as markings to at least one marking unit of the first marking unit type;
   assigning other ones of the detected illuminating means designed as markings and communication elements to at least one marking unit of the second marking unit type;
   assigning a marking function and/or a communication element function to the illuminating means detected in the image; and
   determining the orientation and the position of the marking arrangement based on the markings using knowledge about the arrangement of the markings on the marking arrangement.

8. A method for orientation and position detection of markings in three-dimensional space, the method comprising:
   capturing an image of at least one marking arrangement comprising at least one marking unit of a first marking unit type and at least one marking unit of a second marking unit type, each comprising at least three illuminating means arranged along a path;
   detecting the illuminating means in the captured image;
   assigning detected ones of the illuminating means designed exclusively as markings to at least one marking unit of the first marking unit type;
   assigning other ones of the detected illuminating means designed as markings and communication elements to at least one marking unit of the second marking unit type;
   assigning a marking function and/or a communication element function to the illuminating means detected in the image; and
   determining the orientation and the position of the marking arrangement based on the markings using knowledge about the arrangement of the markings on the marking arrangement.

9. The method according to claim 8, wherein the assigning of the detected illuminating means to the at least one marking unit of the first marking unit type or the at least one marking unit of the second marking unit type includes determining in the captured image all straight paths with a total of exactly three illuminating means.

10. The method according to claim 9, further comprising determining, from an entirety of the determined straight paths, which ones of the straight paths have a corresponding distance between end points of the straight paths.

11. The method according to claim 9, further comprising determining, from an entirety of the determined straight paths, which ones of the straight paths lie in parallel.

12. The method according to claim 9, further comprising selecting the straight paths belonging to the at least one marking unit of the second marking unit type from the determined straight paths, and deriving an identification of the marking arrangement from the communication elements of the at least one marking unit of the second marking unit type.

13. The method according to claim 12, further comprising defining a search area around the straight paths belonging to the second marking unit type, and searching for at least one of the straight paths belonging to the first marking unit type in the search area.

14. A method for teaching in a set-up of markings and communication elements in a marking arrangement, in which at least one marking unit of a first marking unit type and at least one marking unit of a second marking unit type are positioned, each of the marking units having at least three illuminating means arranged along a path, an arrangement of the illuminating means used as markings or communication elements in the marking units of the first marking unit type and the second marking unit type being known a priori, the method comprising:
   moving the marking arrangement with the marking units fixed thereto relative to an image capture unit and capturing a sequence of images during the movement;
   detecting potential marking arrangements in an image of the image sequence;
   tracking the potential marking units over several images of the sequence of images;
   creating initial relations between the marking units and iteratively improving relations over an entirety of the sequence of images until an entirety of the relations over the entirety of the sequence of images with motion is known; and
   deriving an arrangement of the marking units from the entirety of the relations based on geometric assignments.

15. The method according to claim 14, wherein, during the capturing of the sequence of images, no illuminating means are arranged in an image area of the image capturing unit which are not positioned in a marking unit.

\* \* \* \* \*